United States Patent Office 3,040,046
Patented June 19, 1962

3,040,046
QUINOXALINES AND PROCESSES FOR THEIR PRODUCTION

Klaus Sasse, Köln-Stammheim, Richard Wegler, Leverkusen, and Günter Unterstenhöfer, Opladen, Germany, assignors to Farbenfabriken Bayer Aktiengesellschaft, Leverkusen, Germany, a corporation of Germany
No Drawing. Filed Jan. 6, 1961, Ser. No. 80,987
Claims priority application Germany Jan. 14, 1960
14 Claims. (Cl. 260—250)

The present invention relates to and has as its objects new and useful acaricidal and fungicidal agents which may be used in the field of plant protection. The preparation of these compounds is another object of this invention. The new inventive compounds may be represented by the following general formula:

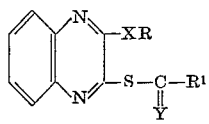

In this formula R stands for an alkyl, aralkyl or aryl radical, $R_1$ stands for an alkoxy group or another radical

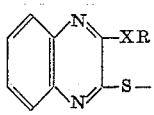

and X and Y stand for oxygen or sulfur, i.e., both X and Y stand for a chalcogen having an atomic number from 8 to 16. The benzene part of the quinoxaline-molecule furthermore may be substituted by conventional or optional substituents.

From copending application Serial No. 823,825 it is known that 2.3-dimercapto-quinoxalines, which may be substituted in the benzene nucleus, yield cyclic di- or tri-thiocarbonates with phosgene and thiophosgene, and open-chain asymmetric esters of mono- or dithiocarbonic acid with chloroformic and thiocarbonic acid ester chlorides. These compounds are distinguished by good acaricidal and fungicidal properties.

In accordance with this invention it has now been found that biologically highly active compounds may also be obtained by reacting 2-alkoxy- and 2-alkylmercapto-3-mercapto-quinoxalines which in addition may contain in the benzene nucleus substituents inert towards acid halides, with phosgene, thiophosgene, chloroformic acid esters and thiocarbonic acid ester halides.

The reaction of phosgene or thiophosgene with 2-alkoxy- and 2-alkylmercapto-3-mercapto-quinoxalines yields compounds of the Formula I

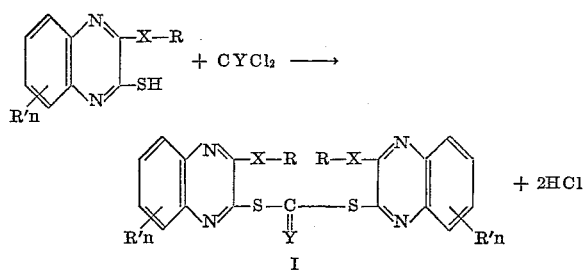

wherein R, X and Y have the significance said above, R' denotes a substituent inert towards $CYCl_2$, and $n$ denotes the number 1–4.

With chloroformic acid esters and thiocarbonic acid ester halides the 2-alkoxy- or 2-alkylmercapto-3-mercapto-quinoxalines may be converted into open-chain thio- or dithiocarbonic acid esters of the Formula II

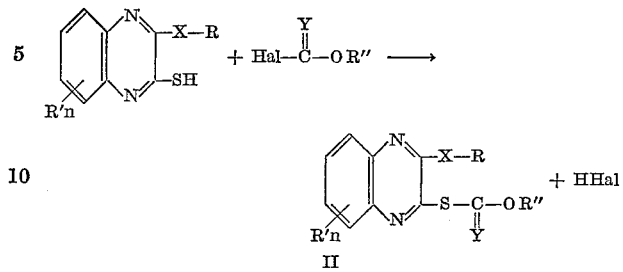

wherein R, R', X, Y and $n$ have the aforesaid significance, and R" represents an aliphatic, araliphatic, cycloaliphatic or aromatic radical.

The reactions for obtaining the compounds I and II are preferably carried out in suitable inert solvents in the presence of acid-binding agents. Suitable acid-binding agents are chiefly alkali metal and alkaline earth metal hydroxides and carbonates, but tertiary amines may also be employed. In most cases the reactions carried out in an aqueous alkaline solution lead to satisfactory results, whereby a water-miscible organic solvent may be used to homogenise the reaction mixture, if desired. It is, however, also possible to operate with a two-phase system i.e. water and immiscible organic solvent, or altogether in the absence of water or solvent.

The 2-alkoxy-3-mercapto-quinoxalines required as starting products can be prepared in known and conventional ways by the reaction of alkali metal sulfides or alkali metal hydrogen sulfides with 2-alkoxy-3-halo-quinoxalines, the 2-alkylmercapto-3-mercapto-quinoxalines can be prepared in analogous manner from 2-alkylmercapto-3-halo-quinoxalines or, alternatively, by partial alkylation of 2,3-dimercapto-quinoxalines.

The compounds obtainable according to the invention possess in the first instance a good activity against spider mites. They may also be used for combating phytopathogenic fungi, some of which also have a systemic action.

The compounds very effectively kill insects like flies, mites, aphids, etc. They distinguish themselves especially by a good contact-insecticidal activity and at the same time by an activity on eating insects such as caterpillars. The compounds may be used in the same manner as other known compounds, i.e., in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As an example for the special utility of the inventive compounds the ester of the following formula:

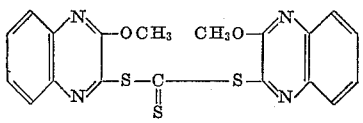

has been tested against spider mites. Aqueous solutions of the aforementioned compound have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration. The test against spider mites has been carried out as follows: (ovicidal action) Bush beans (*Phaseolus vulgaris*) infested with about 100 eggs of *Tetranychus telarius* Hanst (two-spotted spider) are sprayed drip wet with aqueous emulsions as prepared above. Evaluation occurs after 8 days. Each experiment has been rechecked after 14 days. Spider mites were killed 90% with 0.02% solutions.

The following examples are given for the purpose of illustrating the invention.

*Example 1*

19.2 g. of 2-methoxy-3-mercapto-quinoxaline are dissolved in 70 ml. of water with the addition of 4 g. of sodium hydroxide and treated with stirring and cooling at a temperature below 15° C. with a solution of 9.5 g. of chloroformic acid ethyl ester in 70 ml. of acetone. Stirring is continued for a further ½ hour at room temperature and then for another ½ hour at about 40° C. The mixture is cooled, treated with more water and the reaction product is then filtered off with suction through a porcelain funnel. After drying, 20 g. of a compound of the formula

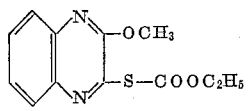

are obtained which melts at 82–84° C. after recrystallisation from ligroin.

By the same way there may be obtained the following compounds:

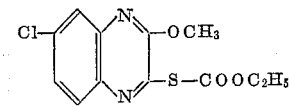

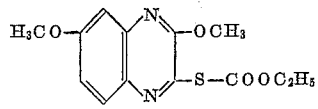

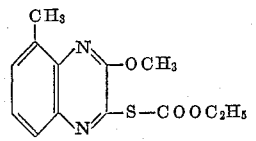

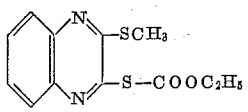

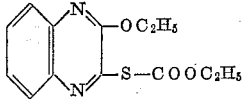

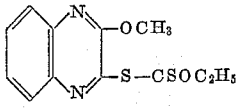

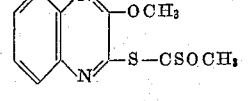

*Example 2*

9.5 g. of thiophosgene are slowly added dropwise with stirring and cooling at a temperature below 15° C. to a solution of 30 g. of 2-methoxy-3-mercapto-quinoxaline and 6.6 g. of sodium hydroxide in 200 ml. of water. The reaction mixture is stirred for a further ½ hour, the precipitated yellow product filtered off with suction, washed with water and dried. Yield 15 g. of a compound of the formula

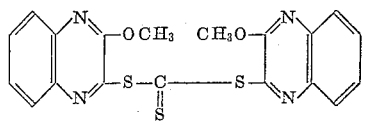

which melts at 120–122° C. after recrystallisation from benzene. The compound kills spider mites 100% even at a concentration of 0.05%.

Starting from S-monoethyl-2.3-dimercapto-quinoxaline there is obtained in analogous manner by the reaction with thiophosgene a compound of the formula

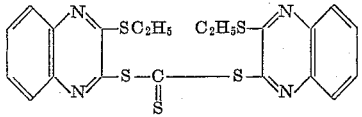

M.P. 159–161° C. (from glycol monomethyl ether/methanol). Spider mites are completely killed with solutions of 0.2%. They are killed 90% with solutions of 0.02%.

By the same way there may be obtained the following compounds:

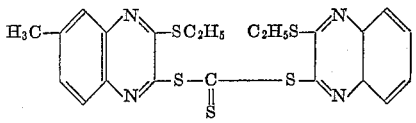

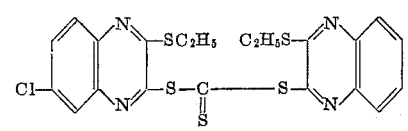

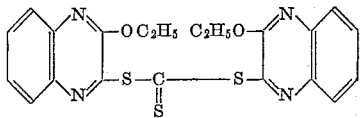

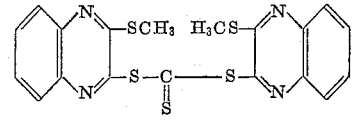

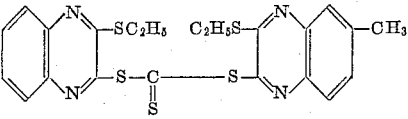

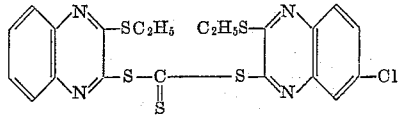

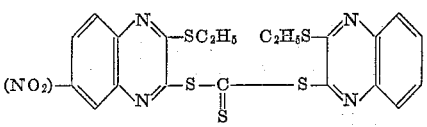

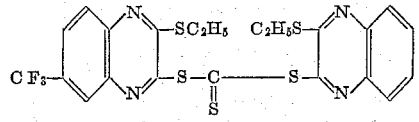

*Example 3*

Into a solution of 30 g. of 2-methoxy-3-mercapto-quinoxaline and 12.5 g. of sodium hydroxide in 200 ml. of water there is introduced with stirring and cooling at a temperature below 15° C. a phosgene stream as rapidly as possible until a constant acid reaction is maintained. The precipitated yellow reaction product is filtered off with suction, washed with water and dried. Yield 27 g. of a compound of the formula

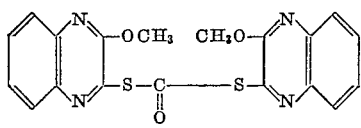

M.P. 165° C. (from carbontetrachloride).

The compound kills spider mites 100% at a concentration of 0.05%.

Starting from S-monoethyl-2.3-dimercapto-quinoxaline there is obtained in analogous manner the compound

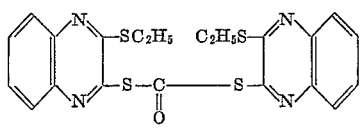

M.P. 144–146° C. (dioxane/ligroin).

By the same way there may be obtained the following compounds:

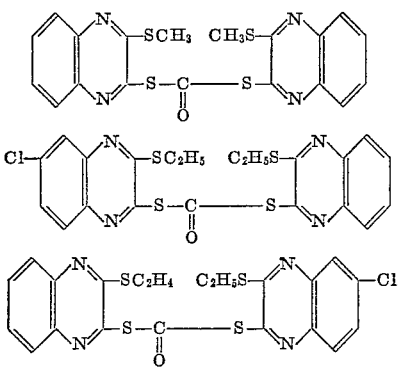

We claim:
1. The compound of the following formula:

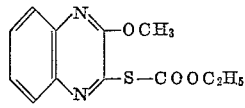

2. The compound of the following formula:

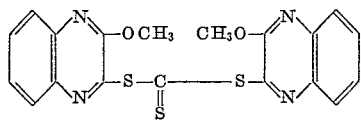

3. The compound of the following formula:

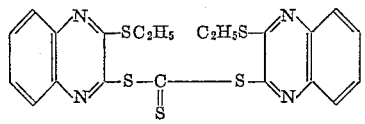

4. The compound of the following formula:

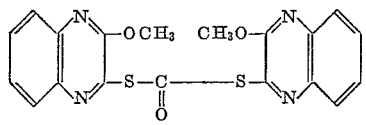

5. The compound of the following formula:

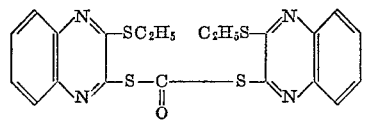

6. A compound of the following formula

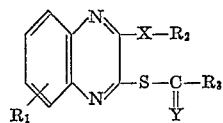

in which $R_1$ stands for a member selected from the group consisting of hydrogen, lower alkyl, lower alkoxy, trifluoromethyl, halogeno, and nitro; $R_2$ stands for lower alkyl having up to 4 carbon atoms, $R_3$ stands for a member selected from the group consisting of lower alkoxy and

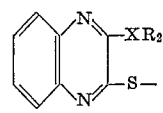

and both X and Y stand for a chalcogen having an atomic number from 8 to 16.

7. A compound of the following formula

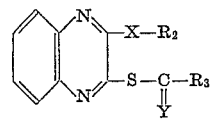

wherein $R_2$ is a lower alkyl radical having up to four carbon atoms, $R_3$ stands for a lower alkoxy radical, and X and Y are each chalcogens having an atomic number from 8 through 16.

8. A compound of claim 7 wherein X and Y are both oxygen.

9. A compound of the following formula

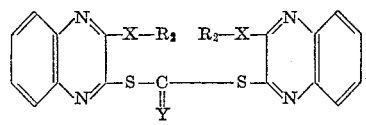

wherein $R_2$ is a lower alkyl radical having up to four carbon atoms, and X and Y are each a chalcogen having an atomic number from 8 through 16.

10. A compound of claim 9 wherein each X is oxygen and Y is sulfur.

11. A compound of claim 9 wherein each X and Y are sulfur.

12. A compound of claim 9 wherein each X and Y are oxygen.

13. A compound of claim 9 wherein each X is sulfur and Y is oxygen.

14. A process for producing new quinoxaline compounds which comprises contacting a compound of the following formula

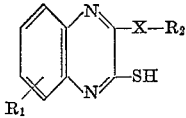

in which $R_1$ is a member selected from the group consisting of hydrogen, lower alkyl, lower alkoxy, trifluoromethyl, halogeno, and nitro; $R_2$ stands for lower alkyl having up to 4 carbon atoms, X stands for a chalcogen having an atomic number from 8 to 16; with a member selected from the group consisting of phosgene, thiophosgene, lower alkyl chloroformic acid ester and lower alkyl thiocarbonic acid ester halides.

No references cited.